United States Patent
Nanukuttan et al.

(10) Patent No.: US 11,410,559 B2
(45) Date of Patent: Aug. 9, 2022

(54) INTELLIGENT UNMANNED AERIAL VEHICLE TRAFFIC MANAGEMENT VIA AN INFRASTRUCTURE NETWORK

(71) Applicant: GE Aviation Systems LLC, Grand Rapids, MI (US)

(72) Inventors: Biju Nanukuttan, Bangalore (IN); Avichandra Yallapalli, Bangalore (IN); Vigneshwaran Venugopalan, Bangalore (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 192 days.

(21) Appl. No.: 16/457,057

(22) Filed: Jun. 28, 2019

(65) Prior Publication Data
US 2020/0013294 A1    Jan. 9, 2020

(51) Int. Cl.
*G08G 5/00*     (2006.01)
*B64C 39/02*    (2006.01)
*G05D 1/00*     (2006.01)

(52) U.S. Cl.
CPC ......... *G08G 5/0013* (2013.01); *B64C 39/024* (2013.01); *G05D 1/0011* (2013.01);
(Continued)

(58) Field of Classification Search
CPC .. G08G 5/0013; G08G 5/0069; B64C 39/024; B64C 2201/141; B64C 2201/146; G05D 1/0011
See application file for complete search history.

(56) References Cited

U.S. PATENT DOCUMENTS 9,087,451 B1    7/2015  Jarrell
9,387,928 B1    7/2016  Gentry et al.
(Continued)

FOREIGN PATENT DOCUMENTS

CN    107534687 A    1/2018
CN    108196572 A    6/2018
JP    2010211536 A    9/2010

OTHER PUBLICATIONS

Güvenç, O. Ozdemir, Y. Yapici, H. Mehrpouyan and D. Matolak, "Detection, localization, and tracking of unauthorized UAS and Jammers," 2017 IEEE/AIAA 36th Digital Avionics Systems Conference (DASC), 2017, pp. 1-10, doi: 10.1109/DASC.2017.8102043.*

(Continued)

*Primary Examiner* — Sze-Hon Kong
*Assistant Examiner* — Mikko Okechukwu Obioha
(74) *Attorney, Agent, or Firm* — Amin, Turocy & Watson, LLP

(57) ABSTRACT

Systems and techniques to facilitate intelligent unmanned aerial vehicle traffic management via an infrastructure network are presented. In an example, a traffic management system can include a data collection component, a flight path component, and a communication component. The data collection component receives navigation data and parameter data associated with an unmanned aerial vehicle. The navigation data is associated with a starting point and destination for the unmanned aerial vehicle. The parameter data is indicative of information associated with the unmanned aerial vehicle. The flight path component generates flight path data for the unmanned aerial vehicle based on the navigation data, the parameter data and infrastructure network data received from an intelligent sensor node net-
(Continued)

work. The communication component transmits the flight path data to the unmanned aerial vehicle.

20 Claims, 10 Drawing Sheets

(52) U.S. Cl.
CPC ...... *G08G 5/0069* (2013.01); *B64C 2201/141* (2013.01); *B64C 2201/146* (2013.01)

(56) References Cited

U.S. PATENT DOCUMENTS

| | | | |
|---|---|---|---|
| 9,466,218 B2 | 10/2016 | Jarrell | |
| 9,527,605 B1 | 12/2016 | Gentry et al. | |
| 9,576,493 B2 | 2/2017 | Jarrell | |
| 9,691,285 B2 | 6/2017 | Jarrell | |
| 9,754,496 B2 | 9/2017 | Chan et al. | |
| 9,792,613 B2 | 10/2017 | Gong et al. | |
| 9,927,807 B1* | 3/2018 | Ganjoo | H04W 76/15 |
| 2015/0371543 A1* | 12/2015 | Amodio Leon | G08G 5/0034 701/528 |
| 2016/0140851 A1 | 5/2016 | Levy et al. | |
| 2016/0328979 A1* | 11/2016 | Postrel | H04W 4/46 |
| 2016/0364989 A1* | 12/2016 | Speasl | G08G 5/0082 |
| 2017/0085632 A1 | 3/2017 | Cardote | |
| 2017/0124884 A1 | 5/2017 | Shaw et al. | |
| 2017/0131717 A1* | 5/2017 | Kugelmass | G08G 5/0013 |
| 2017/0162059 A1 | 6/2017 | Jarrell et al. | |
| 2017/0278405 A1 | 9/2017 | Yakan | |
| 2017/0287341 A1 | 10/2017 | Jarrell et al. | |
| 2017/0301220 A1 | 10/2017 | Jarrell et al. | |
| 2017/0330466 A1 | 11/2017 | Demetriades et al. | |
| 2019/0158597 A1* | 5/2019 | Evans | G08G 5/0017 |
| 2021/0097867 A1* | 4/2021 | Tazume | G08G 5/006 |

OTHER PUBLICATIONS

Extended European Search Report received for European Patent Application Serial No. 19184731.8 dated Nov. 19, 2019, 7 pages.
Communication pursuant to Article 94(3) EPC received for E.P Patent Application Serial No. 19184731.8 dated Dec. 7, 2021, 8 pages.
First Office Action received for Chinese Patent Application Serial No. 201910604307.5 dated May 16, 2022, 10 pages.

\* cited by examiner

INTELLIGENT UNMANNED AERIAL VEHICLE TRAFFIC MANAGEMENT VIA AN INFRASTRUCTURE NETWORK

CROSS-REFERENCE TO RELATED APPLICATIONS

This application claims priority to Indian Application No. 201841025162, filed on Jul. 5, 2018, and entitled "INTELLIGENT UNMANNED AERIAL VEHICLE TRAFFIC MANAGEMENT VIA AN INFRASTRUCTURE NETWORK." The entirety of the foregoing listed application is hereby incorporated by reference herein.

TECHNICAL FIELD

This disclosure relates generally to unmanned aerial vehicles.

BACKGROUND

An unmanned aerial vehicle (e.g., a drone) is an aircraft that can travel through the air without a human aboard the unmanned aerial vehicle. Generally, an unmanned aerial vehicle can navigate to a destination via a set of cameras and/or a set of sensors on the unmanned aerial vehicle that monitor a position of the unmanned aerial vehicle. The position of the unmanned aerial vehicle can then be transmitted to a remote pilot. However, employing a set of cameras and/or a set of sensors on the unmanned aerial vehicle that monitor a position of the unmanned aerial vehicle can impose size, weight and/or power constraints on-board the unmanned aerial vehicle. Furthermore, communication with the unmanned aerial vehicle can be interrupted when the unmanned aerial vehicle is out of line-of-sight from, for example, a remote client and/or a remote navigation control system.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an example embodiment, a system includes a data collection component, a flight path component, and a communication component. The data collection component receives navigation data and parameter data associated with an unmanned aerial vehicle. The navigation data is associated with a starting point and destination for the unmanned aerial vehicle. The parameter data is indicative of information associated with the unmanned aerial vehicle. The flight path component generates flight path data for the unmanned aerial vehicle based on the navigation data, the parameter data and infrastructure network data received from an intelligent sensor node network. The communication component transmits the flight path data to the unmanned aerial vehicle.

According to another example embodiment, a system includes a flight path request component and a communication component. The flight path request component requests flight path data for an unmanned aerial vehicle and provides navigation data and parameter data associated with the unmanned aerial vehicle to a traffic management system associated with an intelligent sensor node network. The navigation data is associated with a starting point and destination for the unmanned aerial vehicle. The parameter data is indicative of information associated with the unmanned aerial vehicle. The communication component receives the flight path data for the unmanned aerial vehicle that is generated based on the navigation data, the parameter data and infrastructure network data received from an intelligent sensor node network.

According to yet another example embodiment, a method is provided. The method includes receiving, by a system comprising a processor, navigation data associated with a starting point and destination for an unmanned aerial vehicle. The method also includes receiving, by the system, parameter data indicative of information associated with the unmanned aerial vehicle. Furthermore, the method includes generating, by the system, flight path data for the unmanned aerial vehicle based on the navigation data, the parameter data and infrastructure network data received from an intelligent sensor node network. The method also includes transmitting, by the system, the flight path data to an unmanned aerial vehicle management system associated with the unmanned aerial vehicle.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
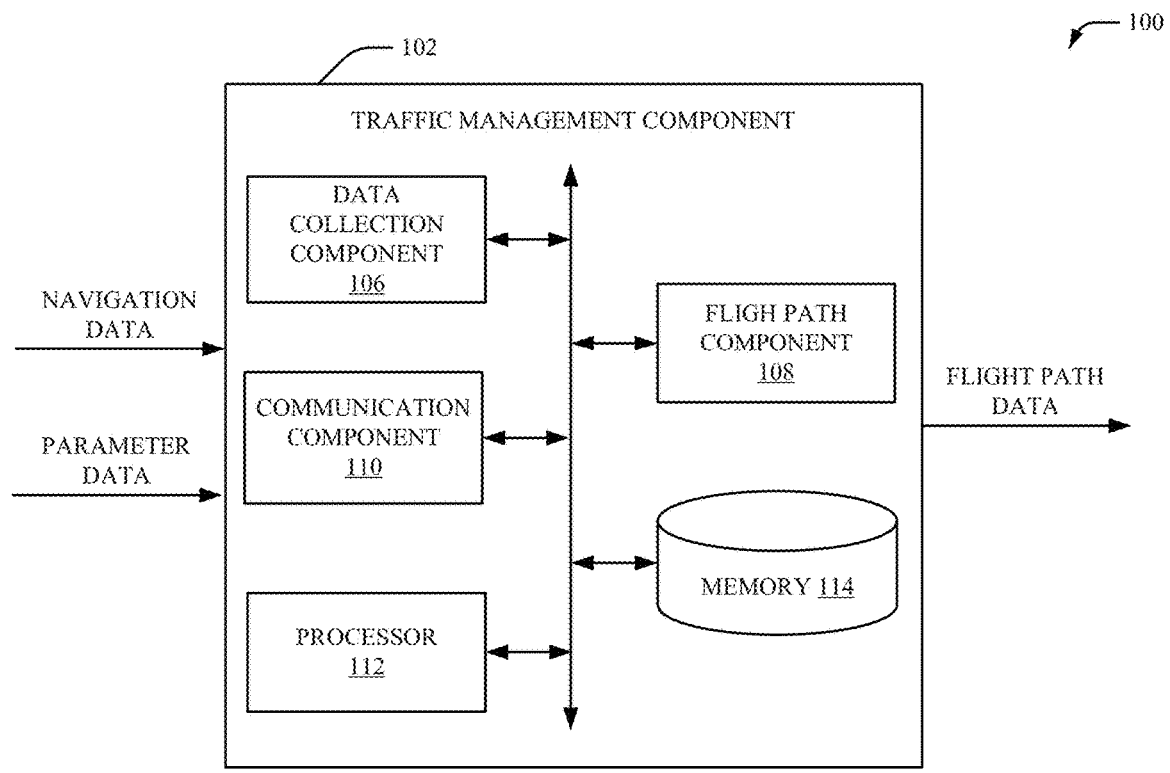
FIG. 1 illustrates a high-level block diagram of an example traffic management component, in accordance with one or more embodiments described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Systems and techniques for intelligent unmanned aerial vehicle traffic management via an infrastructure network are presented. For instance, intelligent unmanned aerial vehicle traffic management and/or intelligent unmanned aerial vehicle trajectory management can be provided via a street light network (e.g., a street light network for a smart city infrastructure). Furthermore, a novel networking mechanism can be provided that monitors an unmanned aerial vehicle and/or advises an optimal route (e.g., a best route) for the unmanned aerial vehicle. In certain embodiments, multiple unmanned aerial vehicles can be monitored in parallel and/or an optimal route (e.g., a best route) for each of the unmanned aerial vehicles can be determined. In an embodiment, a remote pilot for an unmanned aerial vehicle can request a drone flight path for the unmanned aerial vehicle via an application on a computing device. In an aspect, information associated with the drone flight path such as, for example, a starting point for the unmanned aerial vehicle, a destination for the unmanned aerial vehicle, a distance for the unmanned aerial vehicle to travel, an amount of time, traffic for the unmanned aerial vehicle to travel, a priority for the unmanned aerial vehicle with respect to other unmanned aerial vehicles, power availability for the unmanned aerial vehicle to travel, itinerary information for the unmanned aerial vehicle to travel and/or other information associated with the unmanned aerial vehicle can be employed to determine a drone flight path (e.g., a flight path route) for the unmanned aerial vehicle.

In certain embodiments, the application on the computing device can be in communication with the street light network to facilitate exchange of information associated with the drone flight path. The street light network can, for example, employ wireless mesh networking capability of the street light network to determine a route (e.g., a set of waypoints of street light nodes) between a starting point and a destination based on the information associated with the drone flight path. Flight path information that includes the route can also be transmitted to the remote pilot and/or the unmanned aerial vehicle. The flight path information that includes the route can additionally or alternatively include a set of parameters associated with a set of street light nodes of the street light network. The set of parameters can be, for example, a set of four-dimensional (4D) parameters that includes latitude, longitude, altitude, time and/or another parameter. The set of street light nodes can be a set of waypoints for the unmanned aerial vehicle to travel across to reach the destination.

In another embodiment, the remote pilot can initiate the route for the unmanned aerial vehicle via the application on the computing device and/or by setting up a path configuration associated with the unmanned aerial vehicle. Additionally, in an embodiment, the unmanned aerial vehicle can transmit a position of the unmanned aerial vehicle during flight of the unmanned aerial vehicle along the route. Respective street light nodes can also confirm a flight path of the unmanned aerial vehicle when the unmanned aerial vehicle crosses the respective street light nodes until the unmanned aerial vehicle reaches the destination. As such, size of an unmanned aerial vehicle can be reduced, weight of an unmanned aerial vehicle can be reduced, and/or power consumption of an unmanned aerial vehicle can be reduced. Performance of an unmanned aerial vehicle can also be improved during a loss of communication event. Furthermore, an amount of processing by an unmanned aerial vehicle can be reduced since a set of data waypoints (e.g., only a set of data waypoints) can be transmitted to the unmanned aerial vehicle during flight of the unmanned aerial vehicle. Moreover, traffic management and/or trajectory management of an unmanned aerial vehicle can be improved.

Referring initially to FIG. 1, there is illustrated an example system 100 that manages traffic and/or trajectory of an unmanned aerial vehicle, according to an aspect of the subject disclosure. The system 100 can be implemented on or in connection with a server. The system 100 can also be employed by various systems, such as, but not limited to aviation systems, unmanned aerial vehicle systems (e.g., drone systems), vehicle systems, transportation systems, and the like. In an embodiment, the system 100 can be associated with an infrastructure network system that includes an intelligent sensor node network. For instance, the system 100 can be associated with a street light network that includes a set of intelligent street light devices. Moreover, the system 100 and/or the components of the system 100 can be employed to use hardware and/or software to solve problems that are highly technical in nature (e.g., related to unmanned aerial vehicles, related to sensor node networks, etc.), that are not abstract and that cannot be performed as a set of mental acts by a human.

The system 100 can include a traffic management component 102. In FIG. 1, the traffic management component 102 includes a data collection component 106, a flight path component 108 and a communication component 110. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the traffic management component 102) can include memory 114 for storing computer executable components and instructions. The system 100 (e.g., the traffic management component 102) can further include a processor 112 to facilitate operation of the instructions (e.g., computer executable components and instructions) by the system 100 (e.g., the traffic management component 102).

The data collection component 106 can receive navigation data (e.g., NAVIGATION DATA shown in FIG. 1). The navigation data can include navigation information for an unmanned aerial vehicle (e.g., a drone). For example, the navigation data can include a starting point for the unmanned aerial vehicle and/or a destination for the unmanned aerial vehicle. The unmanned aerial vehicle can be an aircraft that can travel through the air without a human aboard the unmanned aerial vehicle. In an embodiment, the unmanned aerial vehicle can travel through the air at approximately 500 feet or less above ground level. Additionally or alternatively, the data collection component 106 can receive parameter data (e.g., PARAMETER DATA shown in FIG. 1). The parameter data can be indicative of information for a set of parameters associated with the unmanned aerial vehicle. The set of parameters can include, for example, distance data relating to distance between the unmanned aerial vehicle and the destination, time data regarding an amount of time associated with a flight path route for the unmanned aerial vehicle, traffic data associated with the unmanned aerial vehicle and one or more other unmanned aerial vehicles, priority data associated with the unmanned aerial vehicle and one or more other unmanned aerial vehicles, power data associated with the unmanned aerial vehicle, itinerary data associated with a flight path route for the unmanned aerial vehicle, and/or another parameter associated with the unmanned aerial vehicle.

The flight path component 108 can generate a flight path data (e.g., FLIGHT PATH DATA shown in FIG. 1) for the unmanned aerial vehicle based on the navigation data, the parameter data and/or infrastructure network data received from an intelligent sensor node network. For instance, the flight path component 108 can generate the flight path data for the unmanned aerial vehicle based on the navigation data, the distance data, the time data, the traffic data, the priority data, the power data, the itinerary data, other parameter data associated with the unmanned aerial vehicle, and/or the infrastructure network data. In an embodiment, the traffic management component 102 can be included in the intelligent sensor node network. In another example, the traffic management component 102 can be in communication with the intelligent sensor node network. In an aspect, the intelligent sensor node network can be a street light network that includes a set of intelligent street light devices. For instance, an intelligent street light device from the set of intelligent street light devices can include one or more sensors and/or a processor to process sensor data captured from the one or more sensors. The flight path data can include 4D data associated with 4D parameters. The 4D parameters can be 4D parameters for infrastructure node devices of the intelligent sensor node network. For example, the 4D parameters can be 4D parameters for the set of intelligent street light devices. The 4D parameters can include, for example, a latitude value associated with an infrastructure node device, a longitude value associated with an infrastructure node device, an altitude value associated with an infrastructure node device, a time value for the unmanned aerial vehicle to cross an infrastructure node device, and/or another parameter associated with an infrastructure node device.

The communication component 110 can facilitate transmission of the flight path data. In an embodiment, the communication component 110 can transmit the flight path data to the unmanned aerial vehicle. For example, the communication component 110 can transmit the flight path data as control data executed by the unmanned aerial vehicle. In another embodiment, the communication component 110 can transmit the flight path data to a computing device associated with a remote pilot for the unmanned aerial vehicle. For example, the communication component 110 can transmit the flight path data for display on an application installed on a computing device associated with a remote pilot for the unmanned aerial vehicle. In an aspect, the communication component 110 can transmit the flight path data via a digital network (e.g., a wired digital network and/or a wireless digital network).

While FIG. 1 depicts separate components in the traffic management component 102, it is to be appreciated that two or more components may be implemented in a common component. Further, it can be appreciated that the design of system 100 and/or the traffic management component 102 can include other component selections, component placements, etc., to facilitate traffic management for an unmanned aerial vehicle.

Figure 2:
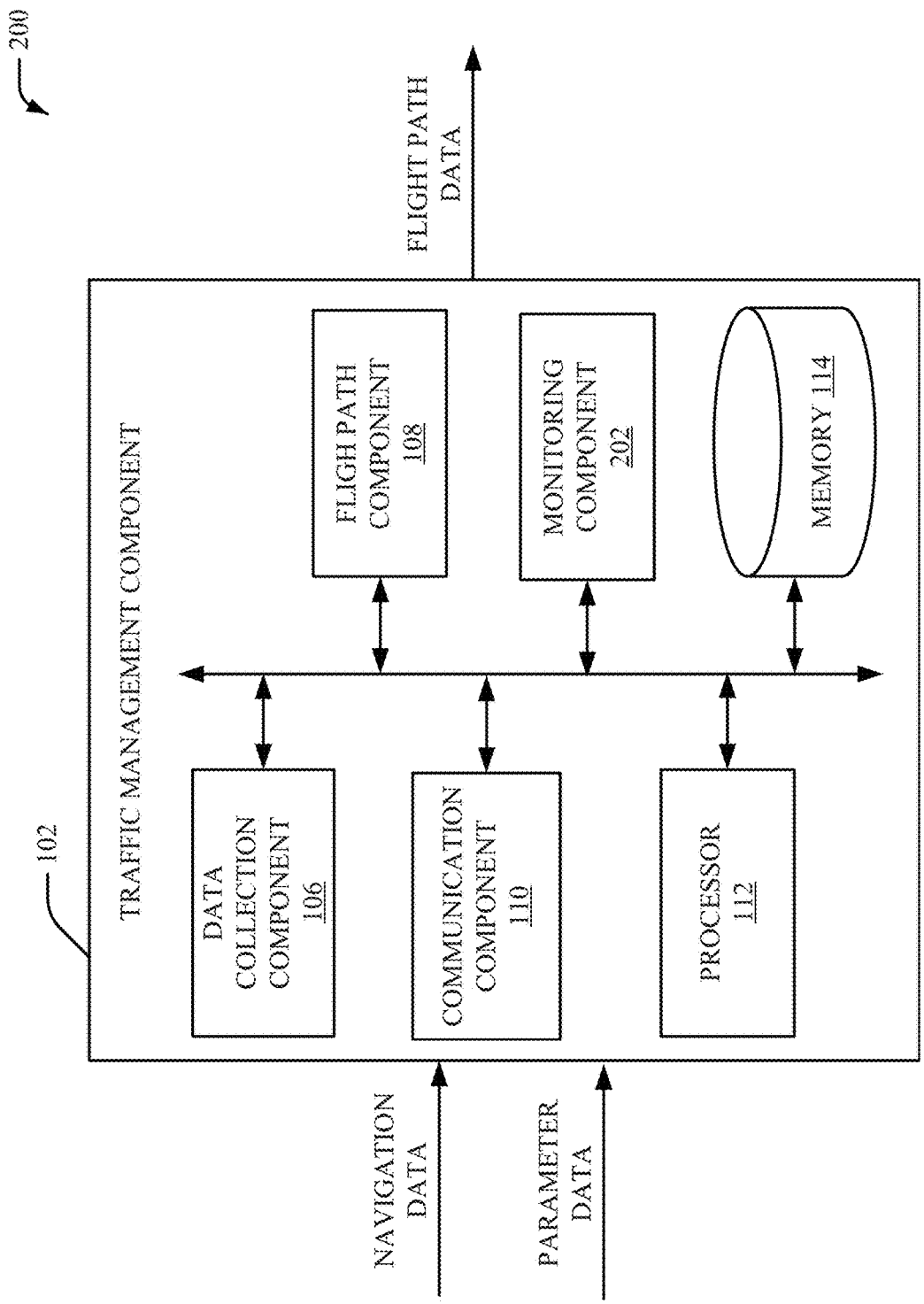
FIG. 2 illustrates a high-level block diagram of another example traffic management component, in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the traffic management component 102. In FIG. 2, the traffic management component 102 includes the data collection component 106, the flight path component 108, the communication component 110, a monitoring component 202, the processor 112 and/or the memory 114. The monitoring component 202 can monitor the unmanned aerial vehicle during advancement of the unmanned aerial vehicle along a flight path route associated with the flight path data. For instance, the monitoring component 202 can monitor the unmanned aerial vehicle during advancement of the unmanned aerial vehicle along the flight path route based on the infrastructure network data. In an aspect, monitoring component 202 can monitor a position of the unmanned aerial vehicle along the flight path route. For example, the unmanned aerial vehicle can transmit a position of the unmanned aerial vehicle to the monitoring component 202 during advancement of the unmanned aerial vehicle along the flight path route. Furthermore, the monitoring component 202 can determine when the unmanned aerial vehicle crosses sensor nodes of the intelligent sensor node network. For example, the monitoring component 202 can determine when the unmanned aerial vehicle reaches particular intelligent street light devices of the street light network. The monitoring component 202 can also confirm that the unmanned aerial vehicle is correctly navigating along the flight path route based on the sensor nodes of the intelligent sensor node network. In an aspect, the monitoring component 202 can determine a set of 4D parameters for the unmanned aerial vehicle to facilitate monitoring of the unmanned aerial vehicle during advancement of the unmanned aerial vehicle along the flight path route. The set of 4D parameters can include, for example, latitude values for the unmanned aerial vehicle along the flight path route, longitude values for the unmanned aerial vehicle along the flight path route, altitude values for the unmanned aerial vehicle along the flight path route, time values that correspond to times that the unmanned aerial vehicle reaches infrastructure node devices, and/or another parameter associated with the unmanned aerial vehicle. In an embodiment, the monitoring component 202 can store the set of 4D parameters associated with the unmanned aerial vehicle in a database associated with a central analytic platform.

While FIG. 2 depicts separate components in the traffic management component 102, it is to be appreciated that two or more components may be implemented in a common component. Further, it can be appreciated that the design of system 200 and/or the traffic management component 102 can include other component selections, component placements, etc., to facilitate traffic management for an unmanned aerial vehicle.

Figure 3:
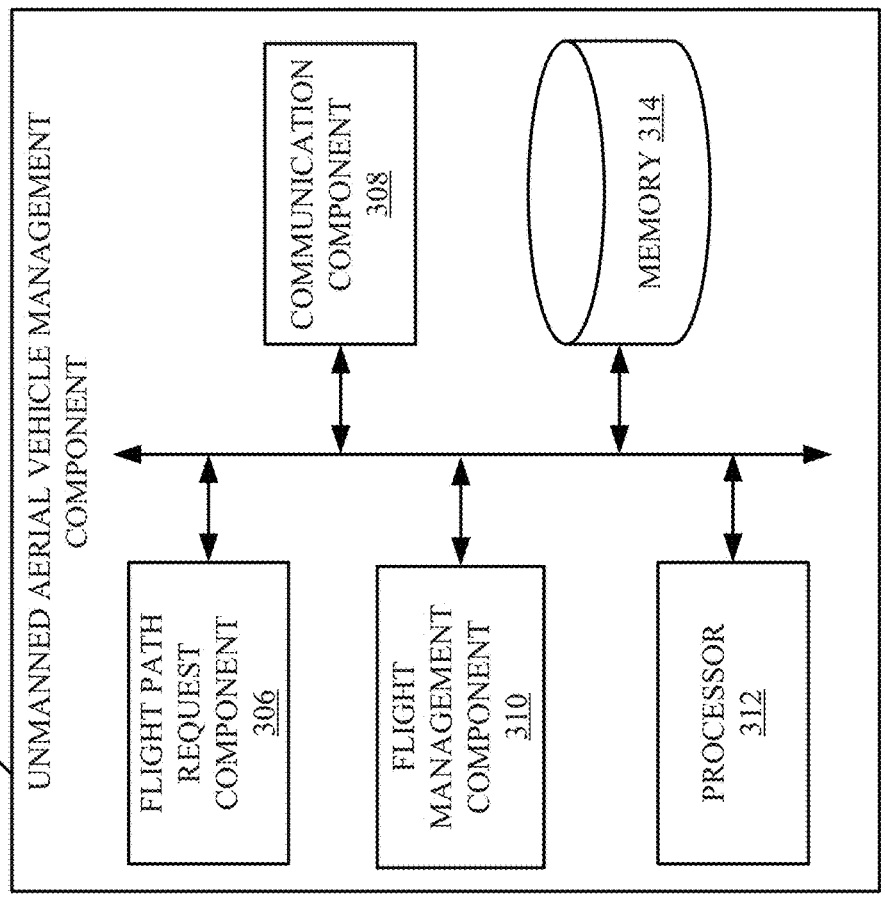
FIG. 3 illustrates a high-level block diagram of an example unmanned aerial vehicle management component, in accordance with one or more embodiments described herein.

Referring now to FIG. 3, there is illustrated an example system 300 that manages traffic and/or trajectory of an unmanned aerial vehicle, according to an aspect of the subject disclosure. The system 300 can be implemented on or in connection with a computing device. The computing device can be, for example, an electronic device, a smart phone, a mobile device, a handheld device, a tablet, a computer, a desktop computer, a laptop computer, a monitor device, a portable computing device or another type of computing device. In one example, the system 300 can be associated with an application (e.g., a software application) executed by the computing device. In an alternate embodiment, the system 300 can be implemented on or in connection with an unmanned aerial vehicle. The system 300 can also be employed by various systems, such as, but not limited to aviation systems, unmanned aerial vehicle systems (e.g., drone systems), vehicle systems, transportation systems, and the like. In an embodiment, the system 300 can be associated with an infrastructure network system that includes an intelligent sensor node network. For instance, the system 300 can be employed in connection with a street light network that includes a set of intelligent street light devices. Moreover, the system 300 and/or the components of the system 300 can be employed to use hardware and/or software to solve problems that are highly technical in nature (e.g., related to unmanned aerial vehicles, related to sensor node networks, etc.), that are not abstract and that cannot be performed as a set of mental acts by a human.

The system 300 can include an unmanned aerial vehicle management component 302. In FIG. 3, the unmanned aerial vehicle management component 302 includes a flight path request component 306, a communication component 308 and a flight management component 310. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 300 (e.g., the unmanned aerial vehicle management component 302) can include memory 314 for storing computer executable components and instructions. The system 300 (e.g., the unmanned aerial vehicle management component 302) can further include a processor 312 to facilitate operation of the instructions (e.g., computer executable components and instructions) by the system 300 (e.g., the unmanned aerial vehicle management component 302).

The flight path request component 304 can request flight path data for an unmanned aerial vehicle. The flight path request component 304 can also provide navigation data and parameter data associated with the unmanned aerial vehicle to a traffic management system associated with an intelligent sensor node network. For example, the flight path request component 304 can provide the navigation data and the parameter data associated with the unmanned aerial vehicle to the traffic management component 102. The navigation data can include navigation information for an unmanned aerial vehicle (e.g., a drone). For example, the navigation data can include a starting point for the unmanned aerial vehicle and/or a destination for the unmanned aerial vehicle. The unmanned aerial vehicle can be an aircraft that can travel through the air without a human aboard the unmanned aerial vehicle. In an embodiment, the unmanned aerial vehicle can travel through the air at approximately 500 feet or less above ground level. The parameter data can be indicative of information for a set of parameters associated with the unmanned aerial vehicle. The set of parameters can include, for example, distance data relating to distance between the unmanned aerial vehicle and the destination, time data regarding an amount of time associated with a flight path route for the unmanned aerial vehicle, traffic data associated with the unmanned aerial vehicle and one or more other unmanned aerial vehicles, priority data associated with the unmanned aerial vehicle and one or more other unmanned aerial vehicles, power data associated with the unmanned aerial vehicle, itinerary data associated with a flight path route for the unmanned aerial vehicle, and/or another parameter associated with the unmanned aerial vehicle. As such, the flight path request component 304 can also provide the distance data, the time data, the traffic data, the priority data, the power data, the itinerary data, and/or the other parameter data associated with the unmanned aerial vehicle to the traffic management system associated with the intelligent sensor node network.

The communication component 308 can receive the flight path data for the unmanned aerial vehicle. The flight path data can be received, for example, from the traffic management system associated with the intelligent sensor node network. Furthermore, the flight path data can be generated based on the navigation data, the parameter data and/or infrastructure network data received from the traffic management system associated with the intelligent sensor node network. For example, the traffic management system associated with the intelligent sensor node network can generate the flight path based on the navigation data, the parameter data and/or infrastructure network data received from the traffic management system associated with the intelligent sensor node network. In one example, the flight path the flight path data can be generated for the unmanned aerial vehicle based on the navigation data, distance data relating to distance between the unmanned aerial vehicle and the destination, time data regarding an amount of time associated with a flight path route for the unmanned aerial vehicle, traffic data associated with the unmanned aerial vehicle and one or more other unmanned aerial vehicles, priority data associated with the unmanned aerial vehicle and one or more other unmanned aerial vehicles, power data associated with the unmanned aerial vehicle, itinerary data associated with a flight path route for the unmanned aerial vehicle, and/or the infrastructure network data. In an aspect, the communication component 308 can receive the flight path data via a digital network (e.g., a wired digital network and/or a wireless digital network).

In an embodiment, the intelligent sensor node network can be a street light network that includes a set of intelligent street light devices. For instance, an intelligent street light device from the set of intelligent street light devices can include one or more sensors and/or a processor to process sensor data captured from the one or more sensors. The flight path data can include 4D data associated with 4D parameters. The 4D parameters can be 4D parameters for infrastructure node devices of the intelligent sensor node network. For example, the 4D parameters can be 4D parameters for the set of intelligent street light devices. The 4D parameters can include, for example, a latitude value associated with an infrastructure node device, a longitude value associated with an infrastructure node device, an altitude value associated with an infrastructure node device, a time value for the unmanned aerial vehicle to cross an infrastructure node device, and/or another parameter associated with an infrastructure node device.

The flight management component 310 can control the unmanned aerial vehicle based on the flight path data. In an embodiment, the flight management component 310 can provide the flight path data to a user (e.g., a remote pilot) that employs a computing device associated with the unmanned aerial vehicle. For example, the flight management component 310 can render the flight path data for display on an application installed on a computing device associated with a remote pilot for the unmanned aerial vehicle. The computing device can be, for example, an electronic device, a smart phone, a mobile device, a handheld device, a tablet, a computer, a desktop computer, a laptop computer, a monitor device, a portable computing device or another type of computing device. In another embodiment, the flight management component 310 can provide the flight path data to the unmanned aerial vehicle. For example, the flight management component 310 can provide the flight path data as control data executed by the unmanned aerial vehicle. In an aspect, the flight management component 310 can control the unmanned aerial vehicle during advancement of the unmanned aerial vehicle along a flight path route associated with the flight path data based on the infrastructure network data. In an embodiment, the flight management component 310 can manage a position of the unmanned aerial vehicle along the flight path route. For example, the flight management component 310 can transmit a position of the unmanned aerial vehicle to the monitoring component 202 during advancement of the unmanned aerial vehicle along the flight path route. Furthermore, the flight management component 310 can also determine a set of 4D parameters for the unmanned aerial vehicle to facilitate management of the unmanned aerial vehicle during advancement of the unmanned aerial vehicle along the flight path route. The set of 4D parameters can include, for example, latitude values for the unmanned aerial vehicle along the flight path route, longitude values for the unmanned aerial vehicle along the flight path route, altitude values for the unmanned aerial vehicle along the flight path route, time values that correspond to times that the unmanned aerial vehicle reaches infrastructure node devices, and/or another parameter associated with the unmanned aerial vehicle.

In certain embodiments, the flight management component 310 can render a user interface for presentation of the flight path data. For instance, a user interface rendered on the computing device can present content associated with the flight path data. In one example, the flight management component 310 can present one or more graphical elements associated with the flight path data. The one or more graphical elements can be in a human interpretable format to allow a user employing the computing device to interpret the flight path data. In one example, the flight path data can be presented via the computing device as one or more of alphanumeric characters, one or more graphics and/or one or more animations. Additionally or alternatively, flight path data can be presented via the computing device as audio data and/or animated data. Furthermore, the flight path data can be static or updated dynamically to provide the flight path data in real-time as changes or events occur with respect to the traffic management component 102. In accordance with one aspect, a graphical element (e.g., a graphical representation) associated with the flight path data can form all or part of a complete display rendered on the computing device. In addition to a graphical representation of the flight path data, one or more items can form part of a display of the computing device. In one example, the flight management component 310 can generate a notification associated with the flight path data, a message associated with the flight path data, an icon associated with the flight path data, a thumbnail associated with the flight path data, a dialog box associated with the flight path data, a tool associated with the flight path data, a widget associated with the flight path data, an animation associated with the flight path data, and/or another display element associated with the flight path data. A graphical element associated with the flight path data can be transparent, translucent or opaque. A graphical element associated with the flight path data can also be various sizes, various colors, various brightness, and so forth as well as being animated (e.g., for fading in and out, etc.). In an embodiment, the flight management component 310 can additionally or alternatively present information regarding an unmanned aerial vehicle associated with the flight path data in a human interpretable format.

While FIG. 3 depicts separate components in the unmanned aerial vehicle management component 302, it is to be appreciated that two or more components may be implemented in a common component. Further, it can be appreciated that the design of system 200 and/or the unmanned aerial vehicle management component 302 can include other component selections, component placements, etc., to facilitate traffic management for an unmanned aerial vehicle.

Figure 4:
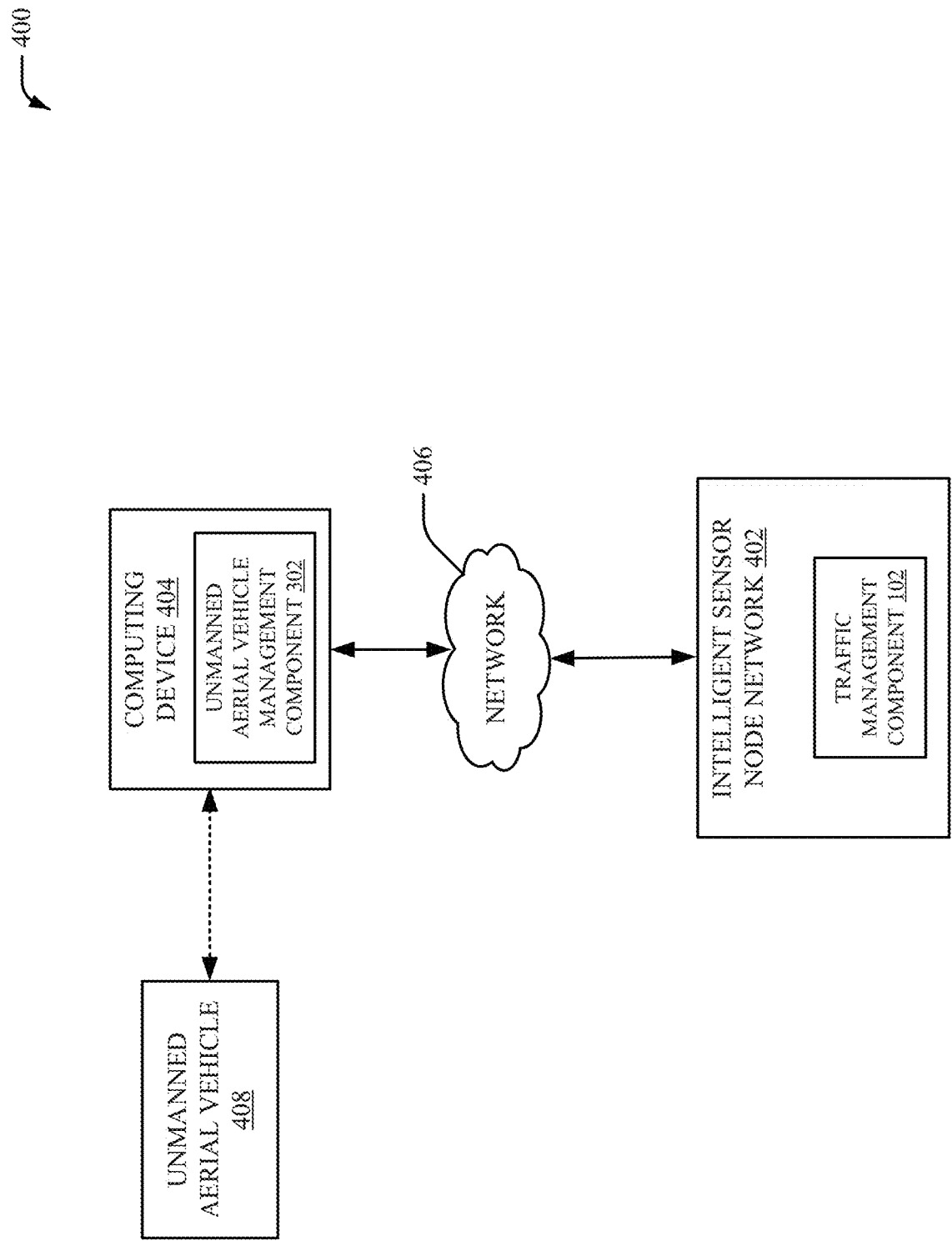
FIG. 4 illustrates an example system for managing traffic and/or trajectory of an unmanned aerial vehicle, in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes an intelligent sensor node network 402 and a computing device 404. The intelligent sensor node network 402 can include the traffic management component 102. The intelligent sensor node network 402 can be an infrastructure network that includes a set of intelligent sensor nodes. For instance, the intelligent sensor node network 402 can include a set of intelligent infrastructure devices that include one or more sensors and/or a processor to process sensor data captured from the one or more sensors. The one or more sensors can be, for example, one or more data collection sensors. The sensor data can be, for example, digital data associated with the one or more sensors. In one example, intelligent sensor node network 402 can be associated with a city environment (e.g., a smart city associated with urban data processing). In an embodiment, the intelligent sensor node network 402 can be a street light network that includes a set of intelligent street light devices. For instance, an intelligent street light device from the set of intelligent street light devices can include one or more sensors and/or a processor to process sensor data captured from the one or more sensors. The computing device 404 can include the unmanned aerial vehicle management component 302. The computing device 404 can be, for example, an electronic device, a smart phone, a mobile device, a handheld device, a tablet, a computer, a desktop computer, a laptop computer, a monitor device, a portable computing device or another type of computing device. Furthermore, in an embodiment, an application (e.g., a software application) associated with the unmanned aerial vehicle management component 302 can be installed on the computing device 404. The intelligent sensor node network 402 and the computing device 404 can be in communication via a network 406. For example, the intelligent sensor node network 402 and the computing device 404 exchange data via the network 406 to facilitate traffic management and/or trajectory management of an unmanned aerial vehicle 408. In an embodiment, the unmanned aerial vehicle management component 302 and the traffic management component 102 can be in communication via the network 406. The network 406 can be a communication network, a wireless network, an internet protocol (IP) network, a voice over IP network, an internet telephony network, a mobile telecommunications network and/or another type of network. The computing device 404 can be in communication with the unmanned aerial vehicle 408. For example, the computing device 404 (e.g., the unmanned aerial vehicle management component 302) can exchange data to facilitate traffic management and/or trajectory management of the unmanned aerial vehicle 408. The unmanned aerial vehicle 408 can be an aircraft (e.g., a drone) that can travel through the air without a human aboard the unmanned aerial vehicle 408. In an embodiment, the unmanned aerial vehicle 408 can travel through the air at approximately 500 feet or less above ground level.

Figure 5:
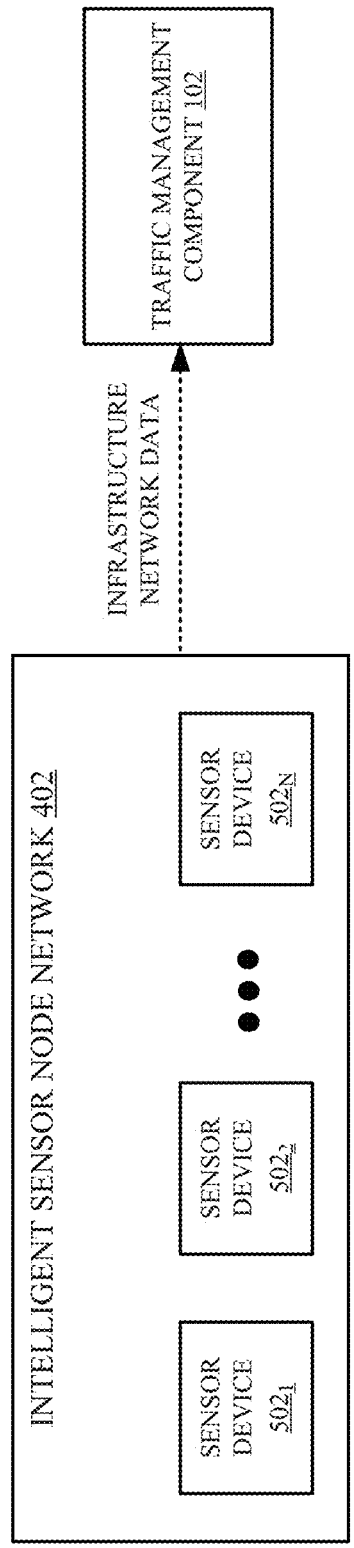
FIG. 5 illustrates an example system for managing traffic and/or trajectory of an unmanned aerial vehicle based on an intelligent sensor node network, in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the intelligent sensor node network 402 and the traffic management component 102. In an embodiment, the traffic management component 102 can be included in the intelligent sensor node network 402. In another embodiment, the traffic management component 102 can be in communication with the intelligent sensor node network 402. The intelligent sensor node network 402 can include a set of sensor devices $502_{1-N}$, where N is an integer. For example, the set of sensor devices $502_{1-N}$ can be a set of intelligent sensor nodes in the intelligent sensor node network 402. In an aspect, the set of sensor devices $502_{1-N}$ can be a set of intelligent infrastructure devices that include one or more sensors and/or a processor to process sensor data captured from the one or more sensors. The one or more sensors of the set of sensor devices $502_{1-N}$ can be, for example, one or more data collection sensors. In an aspect, the set of sensor devices $502_{1-N}$ can collect digital data associated with a city environment. For example, the set of sensor devices $502_{1-N}$ can collect digital data associated with a smart city to facilitate urban data processing. In an embodiment, the set of sensor devices $502_{1-N}$ can be a set of intelligent street light devices. In another embodiment, the set of sensor devices $502_{1-N}$ can for a wireless mesh network for the intelligent sensor node network 402. The traffic management component 102 can obtain infrastructure network data associated with the set of sensor devices $502_{1-N}$ of the intelligent sensor node network 402. The infrastructure network data can include, for example, location data associated with a location for the set of sensor devices $502_{1-N}$, latitude data associated with a latitude value for the set of sensor devices $502_{1-N}$, longitude data associated with a longitude value for the set of sensor devices $502_{1-N}$, and/or other data associated the set of sensor devices $502_{1-N}$. In certain embodiments, the infrastructure network data can additionally or alternatively include the sensor data captured by the set of sensor devices $502_{1-N}$ and/or information associated with analysis of the sensor data captured by the set of sensor devices $502_{1-N}$.

Figure 6:
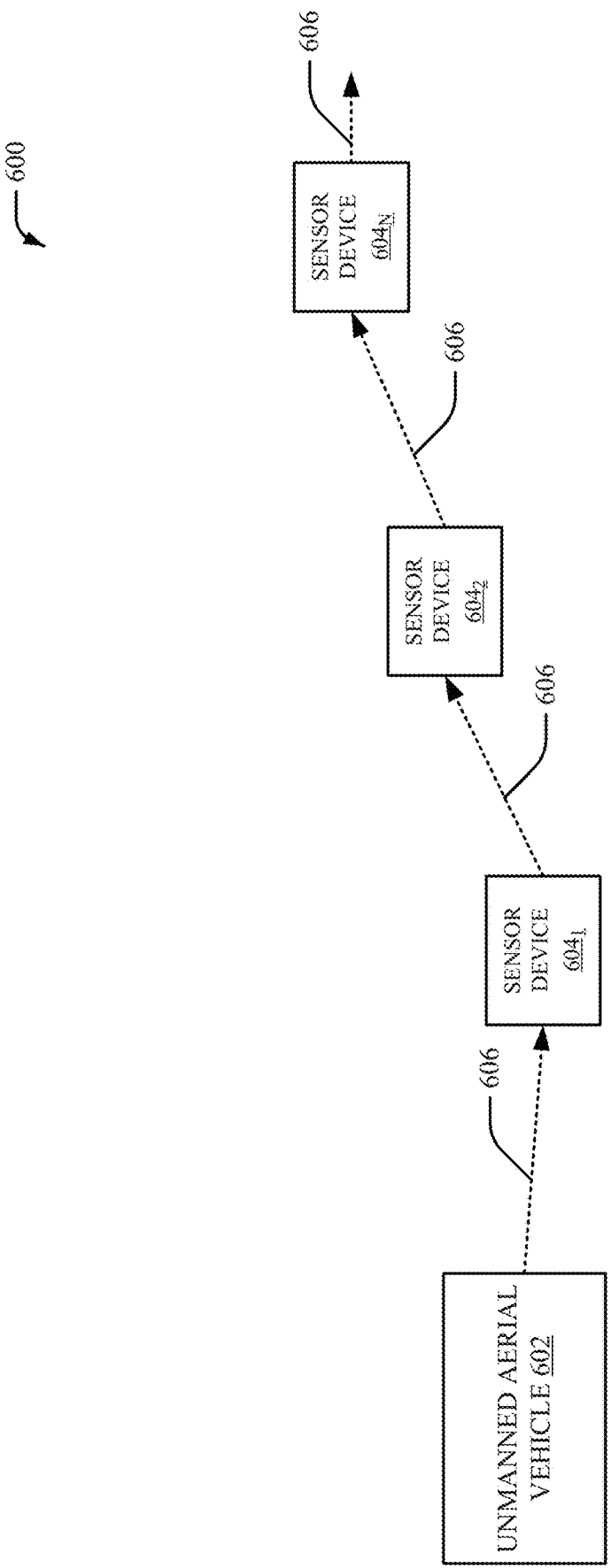
FIG. 6 illustrates an example system for managing traffic and/or trajectory of an unmanned aerial vehicle based on a set of sensor devices, in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes an unmanned aerial vehicle 602 and a set of sensor devices $604_{1-N}$, where N is an integer. The set of sensor devices $604_{1-N}$ can be associated with an intelligent sensor node network (e.g., the intelligent sensor node network 402). In an embodiment, at least a portion of the set of sensor devices $604_{1-N}$ can correspond to the set of sensor devices $502_{1-N}$ associated with infrastructure network data provided to the traffic management component 102. The unmanned aerial vehicle 602 can be an aircraft (e.g., a drone) that can travel through the air without a human aboard the unmanned aerial vehicle 602. In an embodiment, the unmanned aerial vehicle 602 can travel through the air at approximately 500 feet or less above ground level. In one example, the unmanned aerial vehicle 602 can correspond to the unmanned aerial vehicle 408. The set of sensor devices $604_{1-N}$ can be a set of intelligent sensor nodes associated with an intelligent sensor node network. In an aspect, the set of sensor devices $604_{1-N}$ can be a set of intelligent infrastructure devices that include one or more sensors and/or a processor to process sensor data captured from the one or more sensors. The one or more sensors of the set of sensor devices $604_{1-N}$ can be, for example, one or more data collection sensors. In an aspect, the set of sensor devices $604_{1-N}$ can collect digital data associated with a city environment. For example, the set of sensor devices $604_{1-N}$ can collect digital data associated with a smart city to facilitate urban data processing. In an embodiment, the set of sensor devices $604_{1-N}$ can be a set of intelligent street light devices. In another embodiment, the set of sensor devices $604_{1-N}$ can for a wireless mesh network for an intelligent sensor node network.

In an embodiment, a flight path route 606 for the unmanned aerial vehicle 602 can be determined based on the set of sensor devices $604_{1-N}$. For example, the flight path route 606 for the unmanned aerial vehicle 602 can follow the set of sensor devices $604_{1-N}$ such that the unmanned aerial vehicle 602 advances to the sensor device $604_1$, then advances to the sensor device $604_2$, then advances to the sensor device $604_N$, etc. In an aspect, the flight path component 108 can determine the flight path route 606 for the unmanned aerial vehicle 602 based on navigation data, parameter data and/or infrastructure network data associated with the set of sensor devices $604_{1-N}$. Additionally or alternatively, the flight management component 310 can control the unmanned aerial vehicle 602 based on the flight path route 606 associated with the set of sensor devices $604_{1-N}$. In certain embodiments, the flight management component 310 can manage a position of the unmanned aerial vehicle 602 along the flight path route 606. For example, the flight management component 310 can transmit a position of the unmanned aerial vehicle 602 to the monitoring component 202 during advancement of the unmanned aerial vehicle 602 along the flight path route 606. Furthermore, the flight management component 310 can also determine a set of 4D parameters for the unmanned aerial vehicle 602 to facilitate management of the unmanned aerial vehicle during advancement of the unmanned aerial vehicle 602 along the flight path route 606. The set of 4D parameters can include, for example, latitude values for the unmanned aerial vehicle 602 along the flight path route 606 with respect to the set of sensor devices $604_{1-N}$, longitude values for the unmanned aerial vehicle 602 along the flight path route 606 with respect to the set of sensor devices $604_{1-N}$, altitude values for the unmanned aerial vehicle 602 along the flight path route 606 with respect to the set of sensor devices 604$_{1-N}$, time values that correspond to times that the unmanned aerial vehicle 602 reaches the set of sensor devices 604$_{1-N}$, and/or another parameter associated with the unmanned aerial vehicle 602 and/or the set of sensor devices 604$_{1-N}$.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
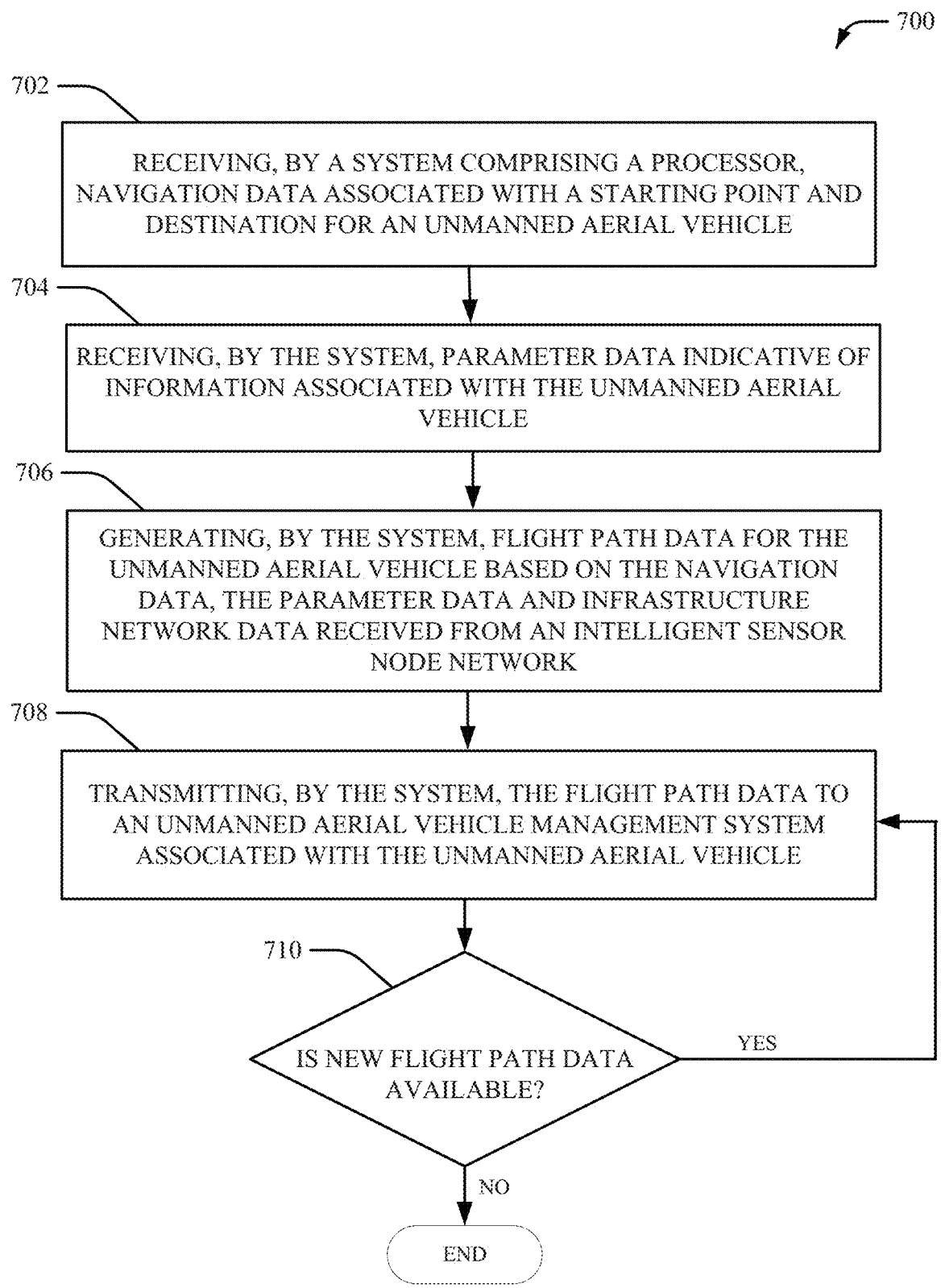
FIG. 7 depicts a flow diagram of an example method for facilitating traffic management associated with an unmanned aerial vehicle, in accordance with one or more embodiments described herein.
Figure 8:
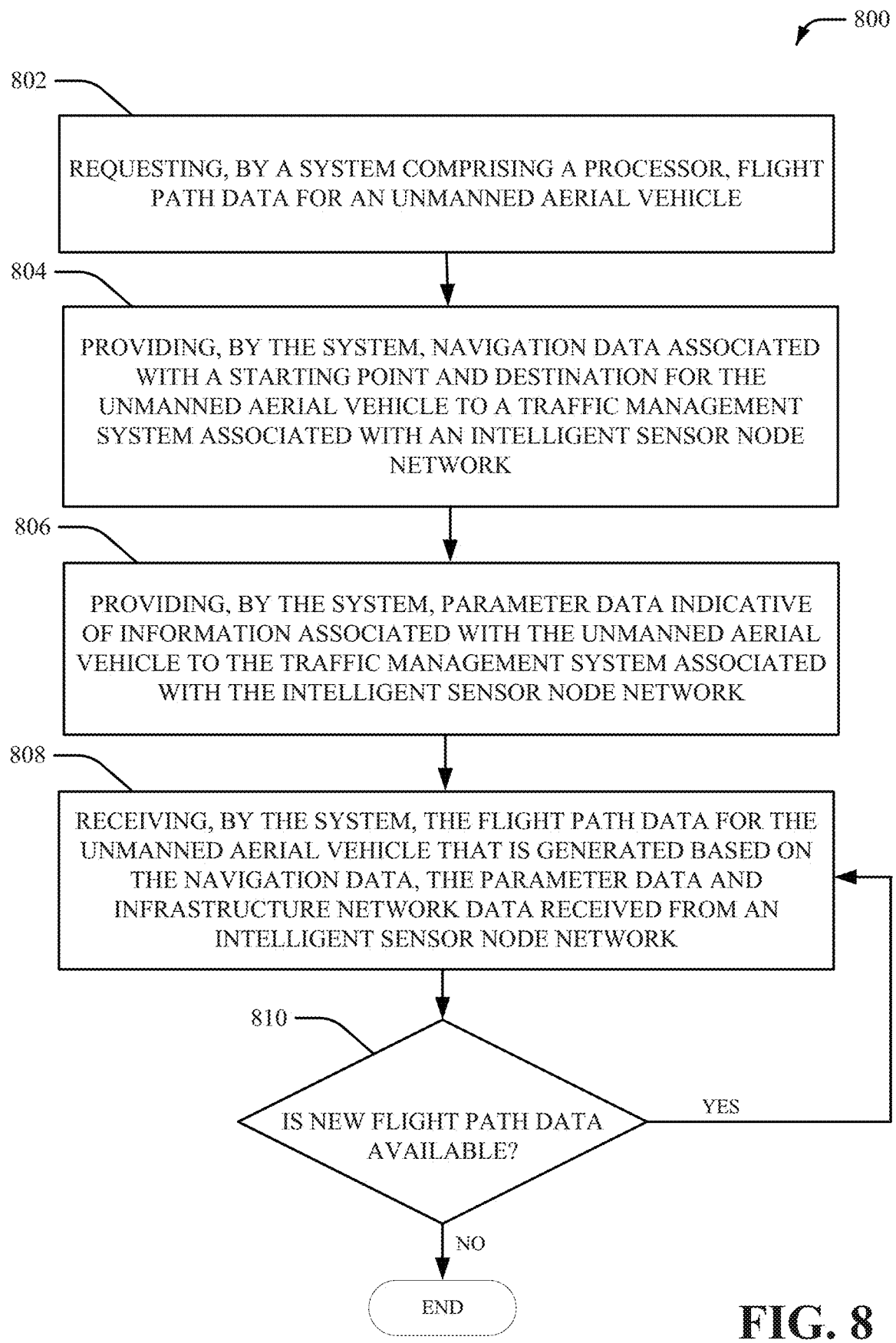
FIG. 8 depicts a flow diagram of an example method for facilitating management associated with an unmanned aerial vehicle, in accordance with one or more embodiments described herein.

FIGS. 7-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 7, there illustrated is a methodology 700 for facilitating traffic management associated with an unmanned aerial vehicle, according to an aspect of the subject innovation. In an embodiment, the methodology 700 can be associated with the traffic management component 102. As an example, the methodology 700 can be utilized in various applications, such as, but not limited to, an unmanned aerial vehicle system (e.g., a drone system), a vehicle system, a transportation system, etc. At 702, navigation data associated with a starting point and destination for an unmanned aerial vehicle is received, by a system comprising a processor (e.g., by data collection component 106). The navigation data can include navigation information for an unmanned aerial vehicle (e.g., a drone) and the navigation information can include a starting point for the unmanned aerial vehicle and/or a destination for the unmanned aerial vehicle. The unmanned aerial vehicle can be an aircraft that can travel through the air without a human aboard the unmanned aerial vehicle. In an embodiment, the unmanned aerial vehicle can travel through the air at approximately 500 feet or less above ground level.

At 704, parameter data indicative of information associated with the unmanned aerial vehicle is received, by the system (e.g., by data collection component 106). The parameter data can be indicative of information for a set of parameters associated with the unmanned aerial vehicle. The set of parameters can include, for example, distance data relating to distance between the unmanned aerial vehicle and the destination, time data regarding an amount of time associated with a flight path route for the unmanned aerial vehicle, traffic data associated with the unmanned aerial vehicle and one or more other unmanned aerial vehicles, priority data associated with the unmanned aerial vehicle and one or more other unmanned aerial vehicles, power data associated with the unmanned aerial vehicle, itinerary data associated with a flight path route for the unmanned aerial vehicle, and/or another parameter associated with the unmanned aerial vehicle.

At 706, flight path data for the unmanned aerial vehicle is generated, by the system (e.g., by flight path component 108), based on the navigation data, the parameter data and infrastructure network data received from an intelligent sensor node network. For instance, the flight path data for the unmanned aerial vehicle can be generated based on the navigation data, the distance data, the time data, the traffic data, the priority data, the power data, the itinerary data, other parameter data associated with the unmanned aerial vehicle, and/or the infrastructure network data. In an aspect, the intelligent sensor node network can be a street light network that includes a set of intelligent street light devices. For instance, an intelligent street light device from the set of intelligent street light devices can include one or more sensors and/or a processor to process sensor data captured from the one or more sensors. The flight path data can include 4D data associated with 4D parameters. The 4D parameters can be 4D parameters for infrastructure node devices of the intelligent sensor node network. For example, the 4D parameters can be 4D parameters for the set of intelligent street light devices. The 4D parameters can include, for example, a latitude value associated with an infrastructure node device, a longitude value associated with an infrastructure node device, an altitude value associated with an infrastructure node device, a time value for the unmanned aerial vehicle to cross an infrastructure node device, and/or another parameter associated with an infrastructure node device.

At 708, the flight path data is transmitted, by the system (e.g., by communication component 110) to an unmanned aerial vehicle management system associated with the unmanned aerial vehicle. In an embodiment, the flight path data can be transmitted to a computing device associated with a remote pilot for the unmanned aerial vehicle. In another embodiment, the flight path data can be transmitted as control data executed by the unmanned aerial vehicle. In an aspect the flight path data can be transmitted via a digital network (e.g., a wired digital network and/or a wireless digital network).

At 710, it is determined whether new flight path data is available. If yes, the methodology 700 returns to 708. If no, the methodology 700 can end.

Referring to FIG. 8, there illustrated is a methodology 800 for facilitating management associated with an unmanned aerial vehicle, according to an aspect of the subject innovation. In an embodiment, the methodology 800 can be associated with the unmanned aerial vehicle management component 302. As an example, the methodology 800 can be utilized in various applications, such as, but not limited to, an unmanned aerial vehicle system (e.g., a drone system), a vehicle system, a transportation system, etc. At 802, flight path data for an unmanned aerial vehicle is requested, by a system comprising a processor (e.g., by flight path request component 306). For example, in an embodiment, the flight path data can be requested via an application (e.g., a software application) installed on a computing device associated with a user (e.g., a remote pilot) for the unmanned aerial vehicle. The computing device can be, for example, an electronic device, a smart phone, a mobile device, a handheld device, a tablet, a computer, a desktop computer, a laptop computer, a monitor device, a portable computing device or another type of computing device. In another embodiment, the flight path data can be requested by the unmanned aerial vehicle (e.g., a navigation control system of the unmanned aerial vehicle). The unmanned aerial vehicle can be an aircraft that can travel through the air without a human aboard the unmanned aerial vehicle. In an embodiment, the unmanned aerial vehicle can travel through the air at approximately 500 feet or less above ground level.

At 804, navigation data associated with a starting point and destination for the unmanned aerial vehicle is provided, by the system (e.g., by flight path request component 306), to a traffic management system associated with an intelligent sensor node network. For example, the navigation data can include navigation information for an unmanned aerial vehicle (e.g., a drone) and the navigation information can include a starting point for the unmanned aerial vehicle and/or a destination for the unmanned aerial vehicle. In an embodiment, the intelligent sensor node network can be a street light network that includes a set of intelligent street light devices. For instance, an intelligent street light device from the set of intelligent street light devices can include one or more sensors and/or a processor to process sensor data captured from the one or more sensors.

At 806, parameter data indicative of information associated with the unmanned aerial vehicle is provided, by the system (e.g., by flight path request component 306), to the traffic management system associated with the intelligent sensor node network. The set of parameters can include, for example, distance data relating to distance between the unmanned aerial vehicle and the destination, time data regarding an amount of time associated with a flight path route for the unmanned aerial vehicle, traffic data associated with the unmanned aerial vehicle and one or more other unmanned aerial vehicles, priority data associated with the unmanned aerial vehicle and one or more other unmanned aerial vehicles, power data associated with the unmanned aerial vehicle, itinerary data associated with a flight path route for the unmanned aerial vehicle, and/or another parameter associated with the unmanned aerial vehicle.

At 808, the flight path data for the unmanned aerial vehicle is received, by the system (e.g., by communication component 308), where the flight path data is generated based on the navigation data, the parameter data and infrastructure network data received from an intelligent sensor node network. For instance, the flight path data for the unmanned aerial vehicle can be generated based on the navigation data, the distance data, the time data, the traffic data, the priority data, the power data, the itinerary data, other parameter data associated with the unmanned aerial vehicle, and/or the infrastructure network data. The flight path data can include 4D data associated with 4D parameters. The 4D parameters can be 4D parameters for infrastructure node devices of the intelligent sensor node network. For example, the 4D parameters can be 4D parameters for the set of intelligent street light devices. The 4D parameters can include, for example, a latitude value associated with an infrastructure node device, a longitude value associated with an infrastructure node device, an altitude value associated with an infrastructure node device, a time value for the unmanned aerial vehicle to cross an infrastructure node device, and/or another parameter associated with an infrastructure node device.

At 810, it is determined whether new flight path data is available. If yes, the methodology 800 returns to 808. If no, the methodology 800 can end.

Figure 9:
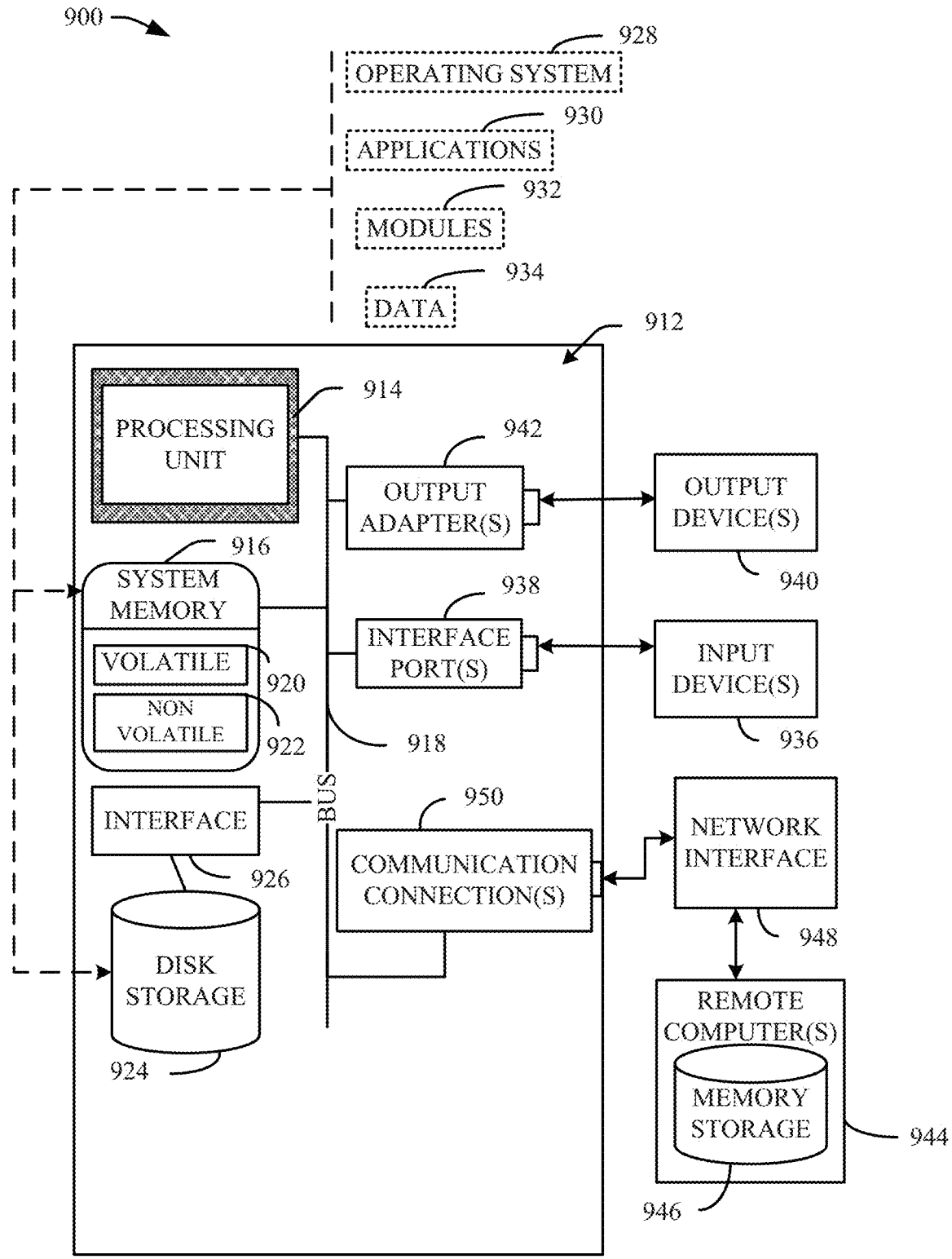
FIG. 9 is a schematic block diagram illustrating a suitable operating environment.
Figure 10:
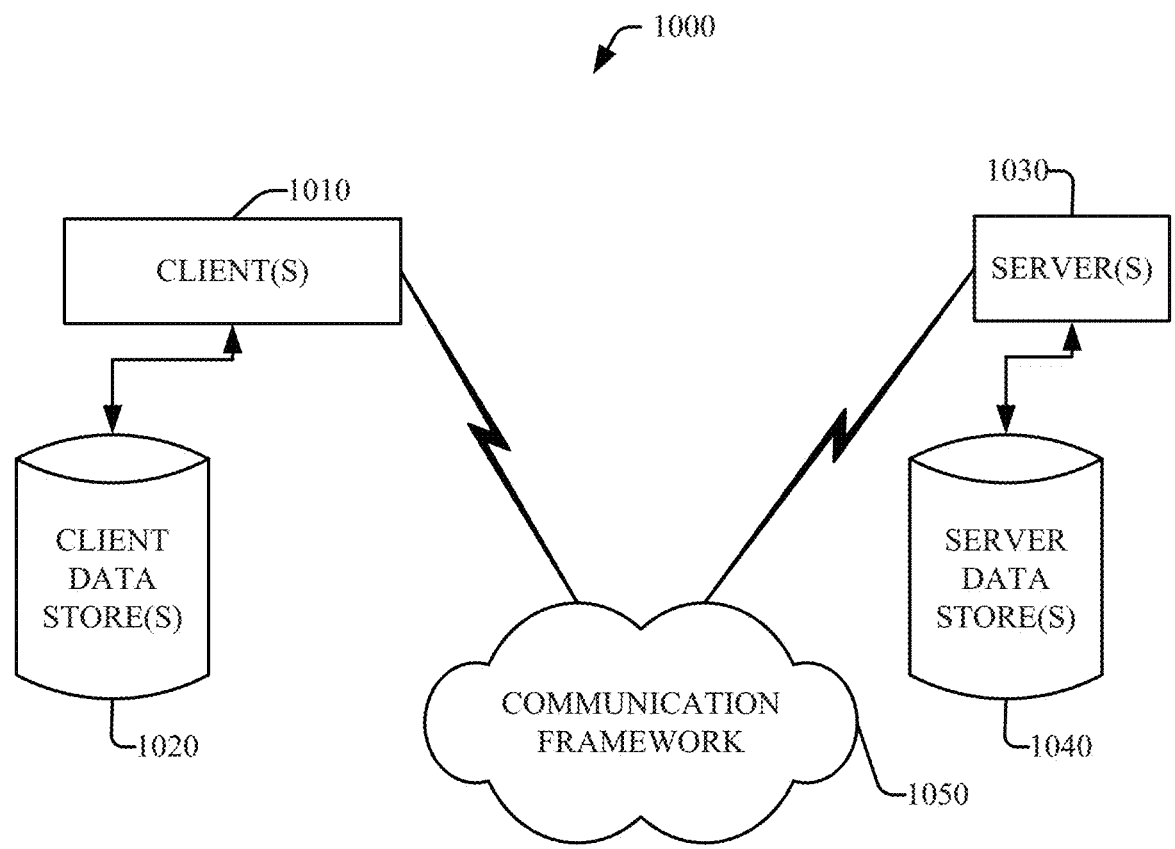
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, a suitable environment 900 for implementing various aspects of this disclosure includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/nonvolatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the subject matter of this disclosure can interact. The sample-computing environment 1000 includes one or more client(s) 1010. The client(s) 1010 can be hardware and/or software (e.g., threads, processes, computing devices). The sample-computing environment 1000 also includes one or more server(s) 1030. Thus, sample-computing environment 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The sample-computing environment 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A traffic management system, comprising:
a memory that stores computer executable components;
a processor that executes the computer executable components stored in the memory, wherein the computer executable components comprise:
a data collection component that receives, from an intelligent sensor node network that comprises a mesh network of node devices, navigation data and parameter data associated with an unmanned aerial vehicle, wherein the navigation data is associated with a starting point and destination for the unmanned aerial vehicle, and wherein the parameter data is indicative of information associated with the unmanned aerial vehicle;
a flight path component that generates flight path data for the unmanned aerial vehicle based on the navigation data, the parameter data, and infrastructure network data, wherein the flight path data comprises information indicative of a flight path route of the unmanned aerial vehicle through the mesh network of node devices;
a communication component that transmits the flight path data to the unmanned aerial vehicle; and
a monitoring component that monitors the unmanned aerial vehicle during advancement of the unmanned aerial vehicle along the flight path route based on receipt of respective notifications from respective node devices of the mesh network of node devices, wherein the respective notifications comprise positional information of the unmanned aerial vehicle and are received based on detection of the unmanned aerial vehicle by the respective sensor nodes as the unmanned aerial vehicle passes the respective node devices of the mesh network of node devices.

2. The traffic management system of claim 1, wherein the parameter data includes distance data relating to distance between the unmanned aerial vehicle and the destination, and wherein the flight path component generates the flight path data for the unmanned aerial vehicle based on the distance data.

3. The traffic management system of claim 1, wherein the parameter data includes time data regarding an amount of time associated with the flight path route for the unmanned aerial vehicle, and wherein the flight path component generates the flight path data for the unmanned aerial vehicle based on the time data.

4. The traffic management system of claim 1, wherein the parameter data includes traffic data associated with the unmanned aerial vehicle and one or more other unmanned aerial vehicles, and wherein the flight path component generates the flight path data for the unmanned aerial vehicle based on the traffic data.

5. The traffic management system of claim 1, wherein the parameter data includes priority data associated with the unmanned aerial vehicle and one or more other unmanned aerial vehicles, and wherein the flight path component generates the flight path data for the unmanned aerial vehicle based on the priority data.

6. The traffic management system of claim 1, wherein the parameter data includes power data associated with the unmanned aerial vehicle, and wherein the flight path component generates the flight path data for the unmanned aerial vehicle based on the power data.

7. The traffic management system of claim 1, wherein the parameter data includes itinerary data associated with the flight path route for the unmanned aerial vehicle, and wherein the flight path component generates the flight path data for the unmanned aerial vehicle based on the itinerary data.

8. The traffic management system of claim 1, wherein the mesh network of node devices comprises a street light network that includes a set of intelligent street light devices, and wherein the flight path component generates the flight path data for the unmanned aerial vehicle based on the street light network.

9. The traffic management system of claim 1, wherein the flight path data comprises four-dimensional data associated with four-dimensional parameters for infrastructure node devices of the mesh network of node devices.

10. An unmanned aerial vehicle management system, comprising:
a memory that stores computer executable components;
a processor that executes the computer executable components stored in the memory, wherein the computer executable components comprise:
a flight path request component that requests flight path data for an unmanned aerial vehicle and provides navigation data and parameter data associated with the unmanned aerial vehicle to a traffic management system associated with an intelligent sensor node network comprising a mesh network of sensor nodes, wherein the navigation data is associated with a starting point and destination for the unmanned aerial vehicle, and wherein the parameter data is indicative of information associated with the unmanned aerial vehicle;
a communication component that receives the flight path data for the unmanned aerial vehicle that is generated based on the navigation data, the parameter data and infrastructure network data received from the intelligent sensor node network; and
a flight management component that controls the unmanned aerial vehicle based on the flight path data and on respective parameter information received from respective sensor nodes of the mesh network as the unmanned aerial vehicle traverses past the respective sensor nodes, wherein the respective parameter information comprise information indicative of a four-dimensional position information and time of arrival of the unmanned aerial vehicle as the unmanned aerial vehicle traverses past the respective sensor nodes.

11. The unmanned aerial vehicle management system of claim 10, wherein the flight path request component provides time data regarding an amount of time associated with a flight path route for the unmanned aerial vehicle to the traffic management system associated with the intelligent sensor node network.

12. The unmanned aerial vehicle traffic management system of claim 10, wherein the flight path request component provides traffic data associated with the unmanned aerial vehicle and one or more other unmanned aerial vehicles to the traffic management system associated with the intelligent sensor node network.

13. The unmanned aerial vehicle traffic management system of claim 10, wherein the flight path request component provides priority data associated with the unmanned aerial vehicle and one or more other unmanned aerial vehicles to the traffic management system associated with the intelligent sensor node network.

14. The unmanned aerial vehicle traffic management system of claim 10, wherein the flight path request component provides power data associated with the unmanned aerial vehicle to the traffic management system associated with the intelligent sensor node network.

15. The unmanned aerial vehicle traffic management system of claim 10, wherein the flight path request component provides itinerary data associated with a flight path route for the unmanned aerial vehicle to the traffic management system associated with the intelligent sensor node network.

16. The unmanned aerial vehicle traffic management system of claim 10, wherein the sensor nodes are integrated into respective street lights of a street light network.

17. A method, comprising:
receiving, by a system comprising a processor, navigation data associated with a starting point and destination for an unmanned aerial vehicle;
receiving, by the system, parameter data indicative of information associated with the unmanned aerial vehicle;
generating, by the system, flight path data for the unmanned aerial vehicle based on the navigation data, the parameter data, and infrastructure network data received from an intelligent sensor node network that comprises a mesh network of sensor nodes, the flight path data comprises a flight path route that traverses at least a portion of the intelligent sensor node network;
transmitting, by the system, the flight path data to an unmanned aerial vehicle management system associated with the unmanned aerial vehicle; and
monitoring movement of the unmanned aerial vehicle along the flight path route, wherein the monitoring comprises, as the unmanned aerial vehicle passes respective sensor nodes of the mesh network of sensor nodes of at least the portion of the intelligent sensor node network, receiving, from the respective sensor nodes, respective indications of the location of the unmanned aerial vehicle, and wherein the respective indications comprise information indicative of position information of the unmanned aerial vehicle and time of arrival of the unmanned aerial vehicle at the respective sensor nodes.

18. The method of claim 17, wherein the transmitting the flight path data comprises transmitting the flight path data to a computing device associated with a remote pilot for the unmanned aerial vehicle.

19. The method of claim 17, wherein the transmitting the flight path data comprises transmitting the flight path data as control data executed by the unmanned aerial vehicle.

20. The method of claim 17, wherein the mesh network of sensor nodes is a street light network comprising a plurality of street light mesh nodes.

* * * * *